United States Patent [19]
Albert

[11] 3,998,104
[45] Dec. 21, 1976

[54] FLUID PRESSURE PULSED REBALANCED ACCELEROMETER

[75] Inventor: William Charles Albert, Boonton, N.J.

[73] Assignee: The Singer Company, Little Falls, N.J.

[22] Filed: June 30, 1975

[21] Appl. No.: 591,433

[52] U.S. Cl. .............................. 73/503; 73/516 R
[51] Int. Cl.² ...................... G01P 7/00; G01P 15/08
[58] Field of Search ................ 73/503, 516 R, 515, 73/517 B

[56] References Cited
UNITED STATES PATENTS

| | | | |
|---|---|---|---|
| 2,943,493 | 7/1960 | Bosch et al. | 73/503 |
| 2,988,920 | 6/1961 | Lees | 73/503 |
| 3,117,456 | 1/1964 | Wing | 73/503 |
| 3,165,934 | 1/1965 | Smoll et al. | 73/516 R |
| 3,771,368 | 11/1973 | Albert | 73/503 |

Primary Examiner—James J. Gill
Attorney, Agent, or Firm—T. W. Kennedy

[57] ABSTRACT

A force rebalanced accelerometer utilizing a spherical proof mass disposed in a fluid and in which fluid pressure pulses developed by positive displacement pump are used to balance inertial forces.

7 Claims, 4 Drawing Figures

FLUID PRESSURE PULSED REBALANCED ACCELEROMETER

BACKGROUND OF THE INVENTION

This invention relates to accelerometers in general and more particularly to an improved forced rebalanced accelerometer utilizing a spherical proof mass and fluid pressure pulses for balancing.

Conventional accelerometers normally use a proof mass supported on a pendulum or the like. In order to obtain rebalancing forces torquer coils are used. As an example of such an accelerometer see U.S. Pat. No. 3,680,393.

Although such accelerometers operate quite well they do have certain disadvantages. Because of the flexure-like pendulum supports there is a mechanical null which is defined as the pendulum position at which flexure torques are zero. Unfortunately, this mechanical null position does not always coincide with the electrical null position which is defined as the pendulum position at which the pickoff electrical output is zero. Due to this lack of coincidence between the two nulls there is bias which is accompanied by bias instability errors caused by mechanical and electrical null position shifts. Furthermore, in order to obtain proper operations in a conventional accelerometer very precise current pulses, both in duration and amplitude, are required to maintain a constant scale factor [dynes/amp]. In order to maintain these pulse characteristics, solid state analog electronic components are utilized. Such solid state components when operated in an analog fashion are susceptible to nuclear radiation to a large degree. This susceptibility exceeds the susceptibility when such semiconductor devices are used in a digital or switching mode. As a result, circuits used with conventional accelerometers are susceptible to radiation and either cannot be used for or must specially designed if to be used in a radiation environment.

Thus, the need for an improved accelerometer which avoids the difficulties associated with conventional prior art accelerometers becomes evident.

SUMMARY OF THE INVENTION

The present invention solves this problem. The proof mass rather than being supported on a pendulum comprises a spherical ball supported within a channel containing damping fluid. The ball is maintained in the proper position through the use of fluid pressure pulses generated by a positive displacement pump. Operation of the positive displacement pump is in response to electrical sensing means sensing the proof mass position. In accordance with the preferred embodiment, the positive displacement pump generating the pressure pulses is driven by a stepper motor responsive to displacements sensed by a pickoff. Each step of the stepper motor constitutes a pressure pulse corresponding to displacement of a known volume of fluid. For a given flow description each step thus is equivalent to a precise velocity change increment. As a result, the system behaves as a digital output accelerometer with pulse rate proportional to acceleration and the time integral of pulse rate proportional to velocity change. Also disclosed is a helix-bellows mechanism to compensate for all temperature sensitive such as viscosity and buoyancy effects.

Through this design a system which is radiation hard is obtained. The accuracy of the instrument scale factor in [G-sec/pulse] is dependent only on the mechanical characteristics of pump displacement per pulse, flow restriction diameters, fluid viscosity, ball size and ball mass which are all radiation hard. The solid state components in this system are all used in the switching mode where they are less sensitive to radiation.

Because there is no flexure joint in a pendulum as in prior art accelerometers there is no mechanical null positions and problems associated with bringing the electrical and mechanical null positions into coincidence are avoided. Thus, excellent null stability is obtained.

Furthermore, two-mode operation is possible. The instrument can operate in an open loop configuration for a portion of the measure and then switch to the closed loop mode when the ball comes into the proximity of the pickoff. By having the pickoff position adjustable the transition point from open to close loop operation can be varied. Open loop operation has as its main advantage that it is passive in operation. Furthermore, a single device contains both open loop and closed loop channels. The stepper motor shaft angular position is a mechanical position proportional to velocity change. Because there are no extremely tight tolerances and most items are stock items, i.e. balls, motors, gears, bellows, etc., the accelerometer can be manufactured in a simple manner at low cost.

Although not as small as a pendulous accelerometer and despite some limitations on accuracy determined by the helix-bellow mechanism the aforementioned advantages make the accelerometer of the present invention particularly applicable where subjected to radiation and in other applications where size and temperature stability are not of supreme importance. For example, it is particularly applicable to re-entry vehicles.

DETAILED DESCRIPTION OF THE PREFERRED EMBODIMENT

Figure 1:
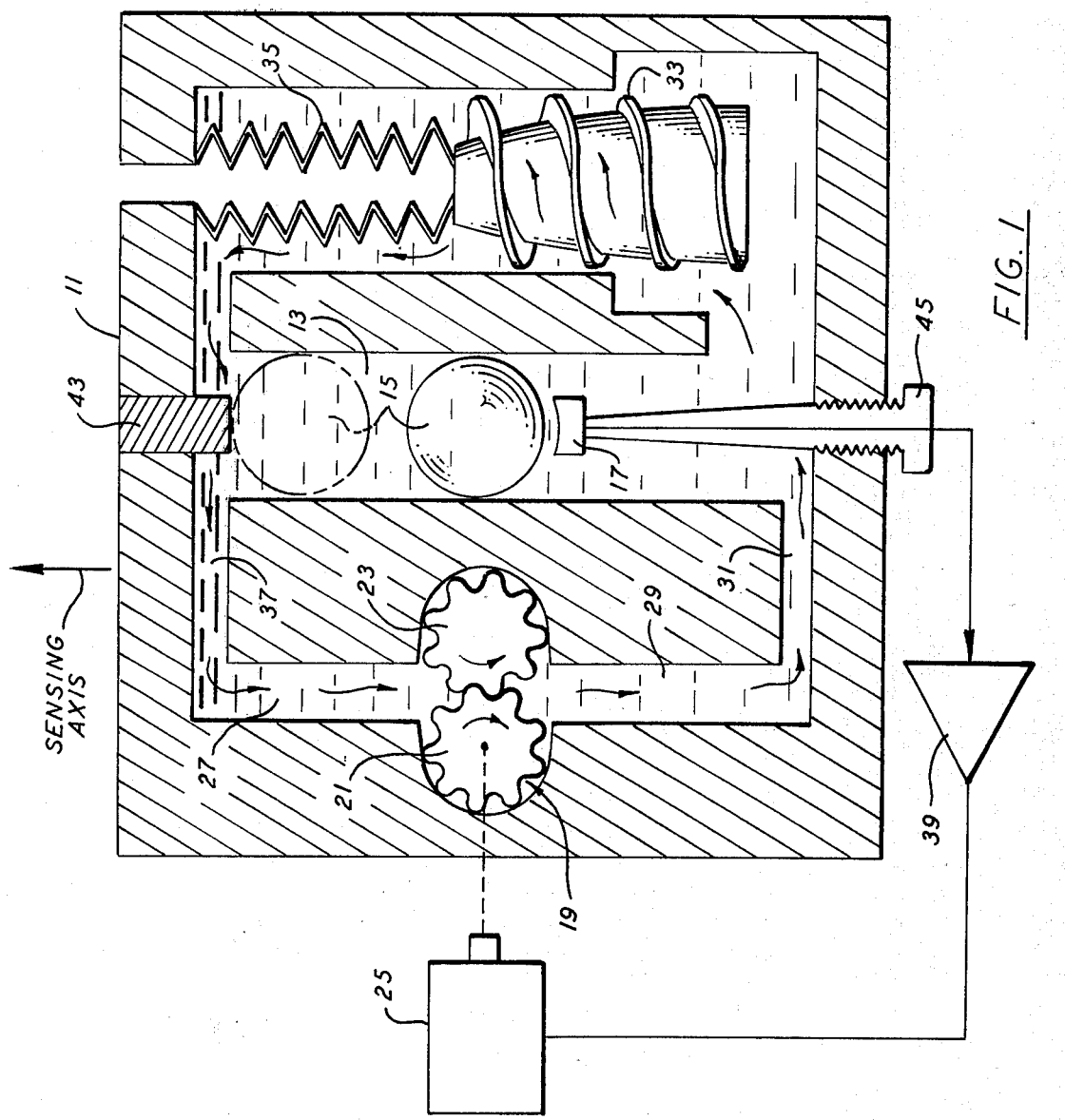
FIG. 1 is a cross sectional view partially schematic in form of the accelerometer of the present invention.

FIG. 1 illustrates, in cross section, the accelerometer of the present invention. Shown is a casing 11 having formed internally a channel 13 of cylindrical shape. Disposed within the channel is a proof mass 15 of slightly smaller diameter which is free to roll within the channel or bore 13. Disposed below the proof mass 15 is a pickoff 17. The pickoff may simply comprise a compliant contact, or may be an optical, capacitive or inductive pickoff. Typical of the types of pickoffs which may be used are those disclosed in U.S. Pat. Nos. 3,771,368 and 3,239,620. Included within the housing 11 is a positive displacement pump 19 of the gear type comprising gears 21 and 23. One of these gears is driven by a stepper motor 25 located outside a housing 11. The pump 19 has an inlet channel 27 and an outlet channel 29. Fluid pumped by the pump 19 flows through channel 29, a channel 31 and then through a helical flow path formed by a helix 33 supported by a bellows 35 the inside of which is opened to the outside of the casing. After flowing past the helical flow path, fluid flows in the direction of the arrows through a top channel 37 to the channel 27 at the pump inlet. The helix and bellows arrangement is constructed in accordance with the teaching of the aforementioned U.S. Pat. No. 3,239,620 and compensates for temperature changes in the manner described therein.

This flow loop including the helix and bellows provides the necessary damping mechanism for the accelerometer. The flow restriction which provides the damping is actually a long, small cross-sectional area helical flow path as more fully described in the aforementioned patent. For good instrument linearity this type of flow restriction is desirable over an orifice because pressure drop is proportional to flow rate over the entire laminar flow range. The helix 33 into which helical grooves are cut is attached to the volume compensating bellows. This bellows shortens and lengthens due to thermal expansion and contraction of the damping fluid and therefore determines how many turns of the helix becomes part of the active flow. A decreasing fluid viscosity due to increasing temperature is thus compensated by more helix turns. The variations of helical groove characteristics along its length are designed to precisely compensate for all predictable thermally sensitive effects on which viscosity is most pronounced. This mechanism essentially maintain a constant scale factor over a wide temperature range. For example, about one-quarter percent scale factor stability can be maintained over a plus and minus 15° temperature range.

Positive displacement pump 19 driven by a stepper motor 25 is employed to insure a precise volume increment of fluid displacement for each step of the motor.

As noted above, the sensor 17 may be a compliant contact such as a cantilevered leaf switch or a conventional optical, capacitive or a conductive device. However, in a radiation hard device it is preferred that the compliant switch contact be used. In that case the switch output is coupled to an amplifier 39 which will simply comprise an appropriate power transistor which will be switched on to provide a pulse to the stepper motor to advance the pump one step. If other types of sensors are used, the amplifier 39 will have to include, in addition to a switching transistor or the like, linear circuits to make an appropriate comparison to deliver a pulse to the switching transistor.

Figure 3:
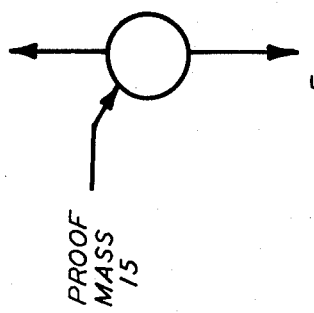
FIG. 3 is a force diagram illustrating the forces on the proof mass.
Figure 2:
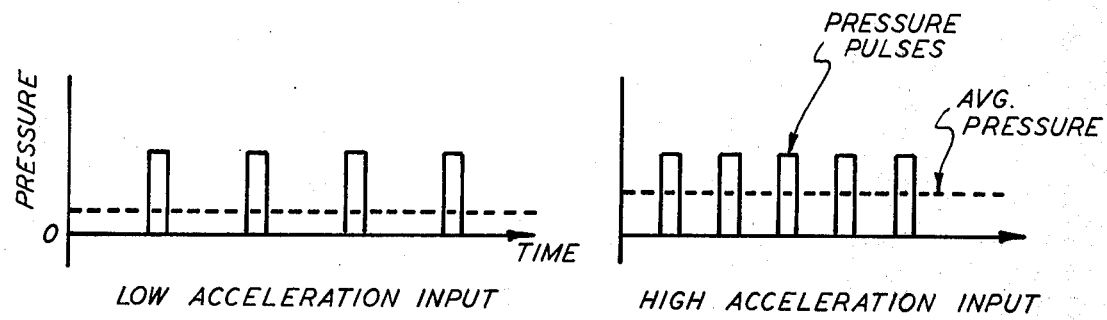
FIG. 2 is a waveform diagram illustrating pressure pulses for low and high acceleration inputs.

The system of FIG. 1 may be operated in either a closed loop mode or a combined open loop closed loop mode. Open loop operation is a type of operation described in the aforementioned U.S. Pat. Nos. 3,771,368 and 3,239,620. For open loop operation, the proof mass 15 can be held in place by a permanent magnet 43. This position is shown in dotted lines. As noted above, an accelerometer of this nature is typically used with re-entry vehicles to sense and integrate the deceleration. The accelerometer comes into play only when a predetermined acceleration is exceeded. At that acceleration, the forces are sufficient to disengage the proof mass 15 from the magnet 43. Proof mass 15 will then move toward the sensor 17 performing an integrating function so that position of the proof mass will be proportional to the vehicle velocity change. The sensor 17 is preferably mounted in an adjustable manner on the end of a screw adjustment device 45. The height of the sensors 17 is preset so that contact will be made at a predetermined velocity. In other words, the making of contact will represent a cutoff velocity. Once reaching that point, the system will go into a closed loop mode. [Although, it should be recognized that the system can operate in the closed loop mode at all times.] Once contact is made with the pickoff 17 the stepper motor is pulsed through the amplifier 39 causing a step of the positive displacement pump 19. This increases the pressure differential across the ball and causes the ball or proof mass 15 to move away from the sensor. FIG. 3 illustrates the force relationships. As long as the acceleration continues, as the pressure drop, the ball will again come into contact with the sensor 17 and another pulse will result from the pump 19. The result of these pulses is illustrated on FIG. 2 with curves for both low acceleration and high acceleration illustrated. The ball 15 will oscillate back and forth with its average position dependent on the pulse rate. This average position is illustrated by the dotted lines on FIG. 2. It should be noted that the pressure results because of the pump having displaced fluid through the flow restriction, i.e. through the helix 33. Thus, in response to these series of pressure pulses the ball will be kept in an average equilibrium position such as the position shown in solid lines on FIG. 1. Thus, the system behaves in a manner similar to conventional force rebalance accelerometers. The difference is that instead of current pulses to a torquer, pressure pulses from a pump are used for the force rebalancing. Because a positive displacement pump is used, each step will displace a known volume of fluid. For a given flow restriction each pulse will be equivalent to a precise velocity change. The system behaves as a digital output accelerometer having a pulse rate proportional to acceleration. The time integral of the pulse rate is proportional to velocity change. This value is directly available from the stepper motor with the stepper motor rotation proportional to the number of steps and thus to velocity change.

Figure 4:
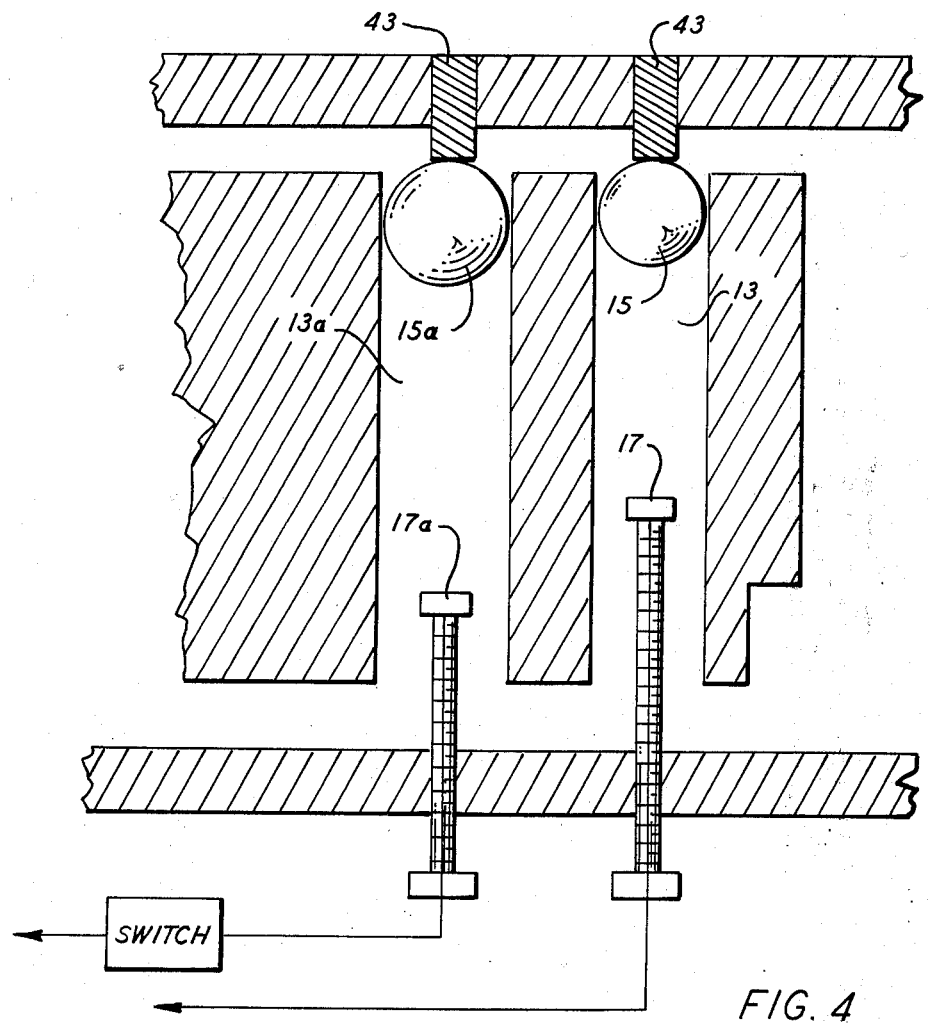
FIG. 4 illustrates an alternate embodiment of the invention.

A partial view of a further embodiment of the present invention is illustrated on FIG. 4. On this embodiment, parallel to the bore 13 containing the proof mass 15 is a further bore 13a containing an additional proof mass 15a. The bore 13a and proof mass 15a are of larger size than the proof mass 15 and bore 13. In the manner disclosed in the aforementioned U.S. Pat. No. 3,771,368 both proof masses are held in place by magnets 43. When subjected to an acceleration which exceeds the holding power of the magnet 43, the ball 15a will first be dislodged and begin its movement downward. Because of its greater mass it will begin moving before the ball 15. Furthermore, as it moves, and as more fully explained in the aforementioned patent, the pressure it creates will insure that the ball 15 remains in the starting position. Upon reaching an additional sensor 17a a switch output is provided to indicate that predetermined velocity has been reached. The ball 15 is now no longer subject to the pressure generated by the movement of the ball 15a and may now move downward subject to the acceleration in the manner described above until it reaches the sensor 17 at which time close loop operation of the type described above commence.

It will be recognized that ball 15a although shown as larger than ball 15 could instead be of a heavier material, i.e. have a greater mass. All that is necessary is that the following condition be satisfied:

$$\frac{m_1 g}{A_1} \times A_2 > m_2 g$$

$m_2 g$ where $m_1$ is the mass of ball 15a and $m_2$ is the mass of ball 15, $A_1$ is the cross-sectional area of ball 15 and $A_2$ is the cross-sectional area of ball 15.

Thus, an improved accelerometer utilizing pressure pulses in place of the commonly used electrical pulses and replacing a pendulous accelerometer with a ball disposed in a fluid to which said pressure pulses are applied has been shown. Although specific embodiments have been illustrated and described, it will be obvious to those skilled in the art that various modifications may be made without departing from the spirit of the invention which is intended to be limited solely by the appended claims.

What is claimed is:

1. An accelerometer comprising:
   a. a casing;
   b. a bore formed in said casing;
   c. a spherical proof mass of a diameter slightly smaller than said bore placed and free to slide within said bore;
   d. a compliant switch disposed within said bore near one end and providing an output signal when contacted by said proof mass;
   e. a fluid filling said bore;
   f. a positive displacement rotary pump having its inlet and outlet in communication with spread parts of said bore, said pump having a shaft;
   g. a restrictive flow passage in fluid communication with said bore and coupling the inlet and outlet of said pump;
   h. a stepper motor having a shaft coupled to said pump shaft for driving said pump;
   i. means coupling the output of said sensor and said stepper motor.

2. Apparatus according to claim 1 wherein said means coupling the output signal of said sensing means to said stepper motor comprises a semiconductor switch.

3. Apparatus according to claim 1 wherein said restrictive flow passage is defined by a helix-bellows arrangement disposed within a bore in said casing.

4. Apparatus according to claim 1 wherein said positive displacement pump is disposed within said casing.

5. Apparatus according to claim 1 and further including an additional bore in said casing, said bore in fluid communication with said first bore and an additional proof mass of larger mass within said second bore, and additional sensor and means for maintaining at least said additional proof mass in a preset initial position predetermined distance from said additional sensor.

6. Apparatus according to claim 1 and further including means generating a force to maintain said proof mass in a predetermined starting position a predetermined distance from said sensing means until the mass of said proof mass times the acceleration to which said proof mass is subjected is greater than said force.

7. Apparatus according to claim 1 wherein said sensor position within said bore is adjustable along the axis of said bore.

* * * * *